United States Patent [19]
Iguchi et al.

[11] Patent Number: 5,561,400
[45] Date of Patent: Oct. 1, 1996

[54] OSCILLATOR UNIT

[75] Inventors: Yutaka Iguchi, Chita-gun; Kazuo Sato, Toyota; Toshihiro Kobayashi; Masayuki Sato, both of Nagoya, all of Japan

[73] Assignee: Aisin Seiki Kabushiki Kaisha, Kariya, Japan

[21] Appl. No.: 539,117

[22] Filed: Oct. 4, 1995

[30] Foreign Application Priority Data

Oct. 5, 1994 [JP] Japan ................................. 6-241101

[51] Int. Cl.$^6$ ............................ H03B 5/04; H03B 5/06; H03B 5/36; H03L 3/00
[52] U.S. Cl. ........................ 331/163; 331/1 A; 331/65; 331/173; 331/158; 73/504.13; 310/318
[58] Field of Search ......................... 331/1 A, 17, 36 C, 331/65, 116 R, 116 FE, 116 M, 158, 163, 173, 175, 177 V, 183; 310/318, 369; 73/504.02, 504.04, 504.12, 504.13, 514.29, 514.34, DIG. 4

[56] References Cited

U.S. PATENT DOCUMENTS

| | | | |
|---|---|---|---|
| 4,609,885 | 9/1986 | Renoult | 331/158 |
| 4,810,922 | 3/1989 | Hirsch | 310/316 |
| 4,951,508 | 8/1990 | Loper, Jr. et al. | 73/504.13 |
| 5,063,358 | 11/1991 | Vale et al. | 331/60 |
| 5,160,901 | 11/1992 | Stone | 331/37 |
| 5,184,094 | 2/1993 | Kohler | 331/158 |
| 5,218,867 | 6/1993 | Varnham et al. | 73/514.29 |
| 5,419,194 | 5/1995 | Varnham et al. | 73/504.13 |

FOREIGN PATENT DOCUMENTS

| | | |
|---|---|---|
| 62-52410 | 3/1987 | Japan . |
| 5-240649 | 9/1993 | Japan . |
| 2154739 | 10/1987 | United Kingdom . |
| 2266149 | 10/1993 | United Kingdom . |

Primary Examiner—David Mis
Attorney, Agent, or Firm—Burns, Doane, Swecker & Mathis, LLP

[57] ABSTRACT

An electrical circuit for reliably starting the oscillation of an oscillator comprising a cylindrical piezoelectric body on which an exciting electrode, a feedback electrode which causes an oscillation, and an electrode for detecting an angular rate are mounted. The electrical circuit includes an exclusive OR gate for detecting a phase difference between an exciting voltage and a voltage developed at the feedback electrode, a circuit for integrating an output voltage from the gate and a band pass filter having its resonant frequency shifted in proportion to a voltage from the integrating circuit. The band pass filter is effective to provide an automatic adjustment of a phase difference of a voltage, which is actually fed back to the exciting electrode, with respect to a voltage developed at the feedback electrode. In this manner, if the natural frequency of the oscillator is offset from a reference value, it is assured that a phase difference between the exciting voltage and the voltage which is actually fed back to the exciting electrode be equal to 360°. The electrical circuit also includes an oscillation starter circuit which increases the gain of a positive feedback loop including the filter for a given time interval immediately after the turn-on of the power.

5 Claims, 13 Drawing Sheets

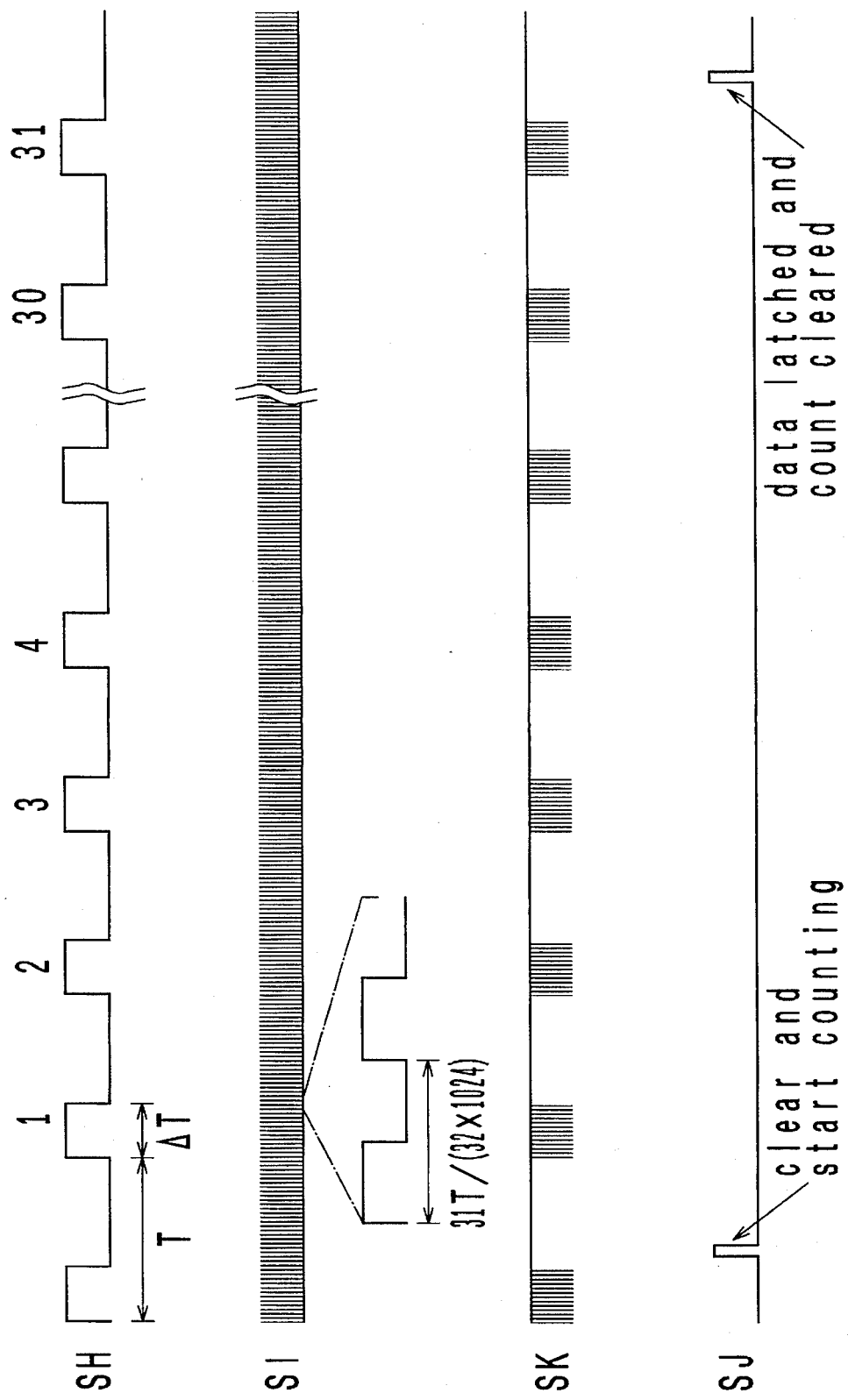

OSCILLATOR UNIT

FIELD OF THE INVENTION

The invention relates to an oscillator unit which may be used in detecting an angular rate, for example.

BACKGROUND OF THE INVENTION

An oscillator unit for use in detecting an angular rate of rotation is disclosed in Japanese Laid-Open Patent Applications No. 52,410/1987 and No. 240,649/1993 and published UK Patent Application GB 2 266 149 A.

In a device for detecting an angular rate of rotation as is disclosed in the Applications cited above, an oscillator such as a piezoelectric element is driven for oscillation at a frequency (resonant frequency) which coincides with the natural frequency thereof, and a phase difference between a voltage applied to an exciting electrode of the oscillator and a voltage which is produced at a detecting electrode is determined. When the oscillator rotates or angularly moves, the phase difference assumes a value which corresponds to the angular rate.

It will be seen that the natural frequency of an oscillator slightly varies from element to element due to a variation in the size during the manufacturing process, and also fluctuates under the influence of an ambient temperature or the like. An oscillator which is used in a device for detecting an angular rate of rotation generally comprises an exciting electrode to which a driving or exciting voltage is applied, a feedback electrode at which a voltage phase displaced about 90° with respect to the voltage applied to the exciting electrode is developed when the oscillator is oscillating at its natural frequency, and a detecting electrode at which a voltage is developed having a phase difference with respect to the exciting voltage which corresponds to the angular rate of the oscillator. An electrical circuit which drives the oscillator for oscillation includes a positive feedback loop in which a voltage developed at the feedback electrode is phase shifted and amplified before it is applied to the exciting electrode. A phase difference between the voltages at the exciting and the feedback electrode significantly deviates from 90° in accordance with a displacement of an actual oscillation frequency with respect to the resonant or natural frequency. In addition, the amplitude of the ocsillation fluctuates. A displacement of the oscillation frequency causes an increased error in determining the angular rate.

Accordingly, in Japanese Laid-Open Patent Application No. 52,410/1987 and in the cited UK Application GB 2,266,149 A, PLL (phase locked loop) circuit is employed to control the oscillation of the oscillator so that the natural frequency is maintained. Specifically, the oscillation frequency of VCO (voltage controlled oscillator) is automatically adjusted so that the phase difference between the exciting voltage and the feedback voltage (namely, the voltage developed at the feedback electrode) is equal to 90°, or so that the oscillation occurs at the resonant frequency.

In Japanese Laid-Open Patent Application No. 240,649/1993, a voltage developed at the feedback electrode of the oscillator is phase shifted in a phase shifter and then amplified before it is applied to the exciting voltage (in a positive feedback manner) for driving the oscillator.

To maintain a stable oscillation of the oscillator at the resonant frequency, it is desirable that PLL circuit be employed to control the drive of the oscillator, as described in Japanese Laid-Open Patent Application No. 52,410/1987 and the cited UK Application GB 2 266 149 A. However, such a device may fail to start the oscillation immediately after the power is turned on. For example, if VCO should begin to oscillate at a frequency which is displaced from the resonant frequency of the oscillator immediately upon turn-on of the power, the amplitude of oscillation of the oscillator is reduced while the amplitude of undesired oscillation components (noises) increase relative to the resonant frequency component, so that a noise signal having frequencies other than the resonant frequency may be applied to a phase comparator, which forms part of the PLL circuit, or no signal may be applied thereto. As a consequence, the oscillator may oscillate out of the resonant frequency or may fail to oscillate entirely.

Referring to FIGS. 3a and 3b which show an oscillator 2, a phase difference of about 90°, at the resonant frequency of an oscillator 2, is developed between a voltage applied to exciting electrodes 5a, 5b of the oscillator 2 and a voltage developed at feedback electrodes 4a, 4b. Accordingly, by phase shifting the voltage developed at the feedback electrodes 4a, 4b by 270° to apply a positive feedback to the exciting electrodes 5a, 5b, the oscillator 2 may be driven into oscillation. However, immediately after the power is turned on to the circuit, for example, signals having frequencies which are displaced from the resonant frequency may appear at the feedback electrodes 4a, 4b of the oscillator 2. In such instance, the phase difference between the voltage applied to the exciting electrodes 5a, 5b of the oscillator 2 and the voltage developed at the feedback electrodes 4a, 4b will be offset from 90°, resulting in a failure to apply a positive feedback to the exciting electrodes 5a, 5b and hence to maintain the oscillation. In this manner, the circuit may fail to start the oscillation. In addition, if the resonant frequency of the oscillator is offset from a reference value or designed value due to variation in the response of the oscillators 2 or due to a temperature change, the magnitude of a phase shift caused by electrical circuit elements contained in a closed loop (positive feedback) circuit may mismatch the oscillation frequency of the oscillator, i.e., deviating from a phase difference of 270°, causing a failure to oscillate.

SUMMARY OF THE INVENTION

It is an object of the invention to assure a starting of the oscillation of the oscillator at its resonant frequency.

An oscillator unit according to the invention comprises an oscillator including an exciting electrode, a feedback electrode and a detecting electrode; phase difference detecting means for detecting a deviation of an actual phase difference between a voltage applied to the exciting electrode and a voltage developed at the feedback electrode relative to a reference phase difference between such voltages which would occur when the oscillator is oscillating at its natural frequency; and filter means responsive to the deviation for picking off frequency components in the voltage developed at the feedback electrode which are required to substantially null the deviation and for feeding it back to the exciting electrode. With this arrangement, frequency components, which are effective to bring the actual phase difference between the voltage applied to the exciting electrode and the voltage developed at the feedback electrode to the reference phase difference, are picked off and applied to the exciting electrode by the filter means, whereby the actual phase difference converges to the reference phase difference. In a preferred embodiment of the invention, the loop gain of the positive feedback loop circuit including the filter means is increased for a given time interval upon initiating the application of an exciting voltage to the exciting electrode, whereby the positive feedback voltage which is applied to bring the actual phase difference to the reference phase difference has a higher level immediately upon turning on the power to the device, thus assuring a rapid convergence of the actual phase difference to the reference phase difference.

Other objects and features of the invention will become apparent from the following description of an embodiment thereof with reference to the drawings.

BRIEF DESCRIPTION OF THE DRAWINGS

FIG. 3b is a plan view of the oscillator 10 shown in FIG. 3a;

FIG. 7 is a series of timing charts illustrating various electrical signals appearing at various points in the electrical circuit shown in FIG. 1;

DESCRIPTION OF PREFERRED EMBODIMENT

Figure 1:
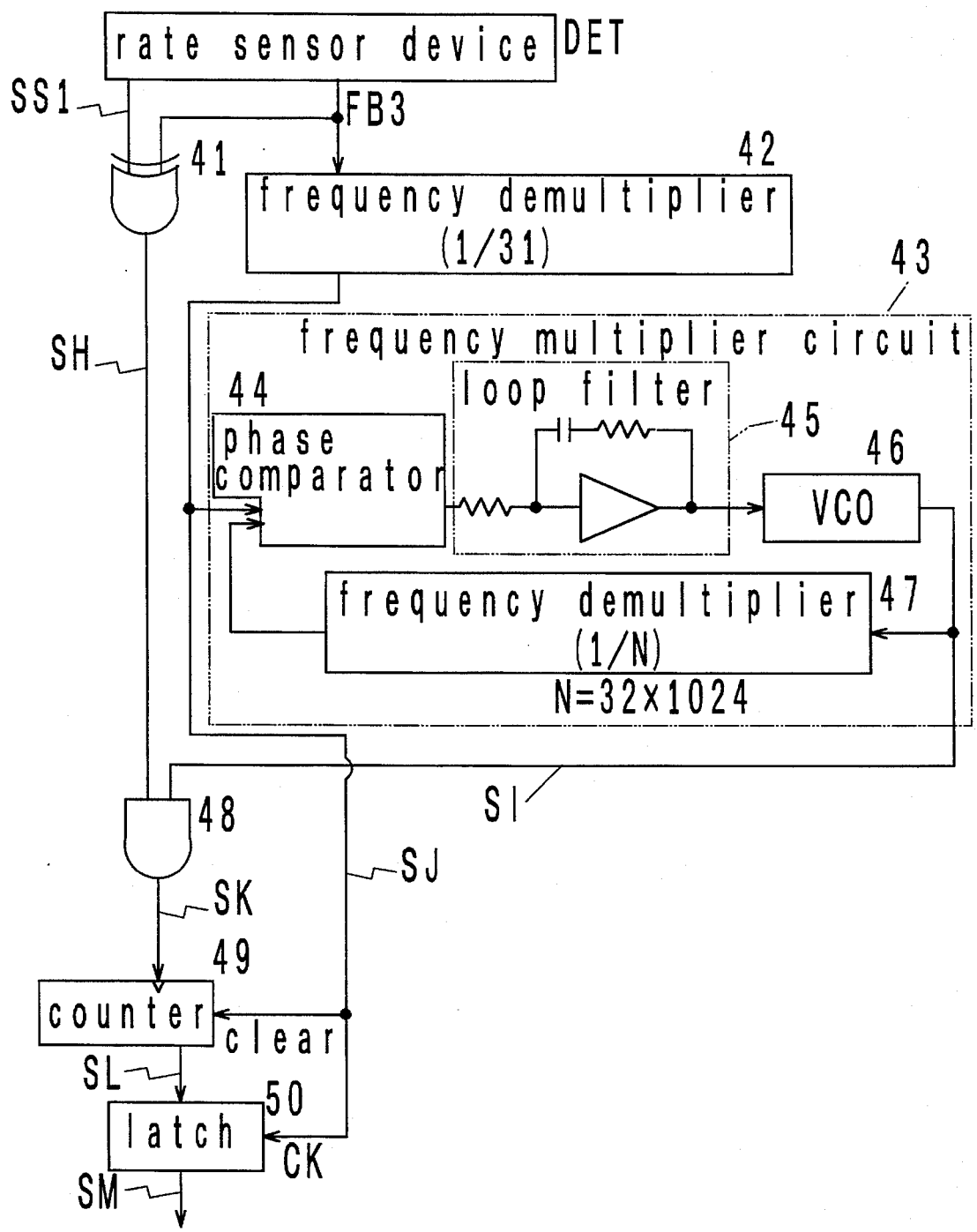
FIG. 1 is a block diagram of one embodiment of the invention.

Referring to FIG. 1, a rate sensor device DET delivers a pair of signals SS1 and FB3, each of which is a binary signal having a repetition frequency of about 8 kHz, a phase difference therebetween varying with an angular rate of rotation applied to the oscillator 10 as will be described later. An exclusive OR gate 41 produces a binary signal SH having a pulse width $\Delta T$ which depends on the phase difference between the two signals SS1 and FB3. The pulse width of the binary signal SH is counted by a counter 49, and the count latched in a latch 50.

AND gate 48 receives the output signal SH from the exclusive OR gate 41 and an output signal SI from a frequency multiplier circuit 43, and forms a pulse signal SK, which is applied to the counter 49 as a clock pulse to be counted.

A frequency demultiplier 42 receives the output signal FB3 from the rate sensor device DET, and forms a signal SJ having a frequency which is 1/31 times that of the input. The signal SJ is applied to an input terminal of a frequency multiplier circuit 43, to a clear terminal of the counter 49 and a latch control terminal CK of the latch 50. The frequency multiplier circuit 43 comprises a phase comparator 44, a loop filter 45, VCO (voltage controlled oscillator) 46 and a frequency demultiplier 47. The frequency demultiplier 47 forms a signal having a frequency which is $1/(32 \times 1024)$ times that of the input. The frequency multiplier circuit 43 controls VCO 46 such that the signal SJ applied to one of input terminals of the phase comparator 44 coincides in phase with the signal applied to the other input, namely, the output from the frequency demultiplier 47. Accordingly, a signal SI which is delivered by the frequency multiplier circuit 43 has a frequency which is $32 \times 1024$ times that of the input (SJ).

As shown in FIG. 7, the signal SH assumes a high level H for an interval of $\Delta T$ at a period of T. Pulses in the signal SI appears as a signal SK during a time interval when the signal SH assumes a high level. The number of pulses in the signal SK or a time interval corresponding to $\Delta T$ which in turn corresponds to the angular rate is counted by the counter 49. Since the counter 49 is cleared by the signal SJ having a period which is equal to 31T, the counter 39 calculates and accumulates a time value of $\Delta T \times 31$ during the time interval of 31T, and the accumulated value is latched in the latch 50 to be delivered as a signal SM.

It is to be noted that in the circuit shown in FIG. 1, the frequency demultiplier 42 has a frequency dividing ratio of 1/31 and the frequency demultiplier 47 has a frequency dividing ratio which is chosen to be an integral multiple of 32 for a particular reason. Specifically, by choosing the frequency of the signal SI, which is a count pulse input to the counter 49, so as to be offset from an integral multiple of a frequency f(1/T) of the signal SH, the accuracy of measurement can be improved without choosing too high a frequency for the signal SI.

Assume that the frequency dividing ratio of the frequency demultiplier 42 is changed to 1/32 in the circuit shown of FIG. 1. Then the frequency of the signal SI will be 1024f, and accordingly the resolution achieved when determining the phase difference (ΔT/T) will be 1/1024, thus preventing a minute change in the angular rate from being determined. If a higher frequency is chosen for the signal SI in order to enhance the resolution, related circuit such as the counter 49 which is used in determining the angular rate must be constructed with a special circuit which operates at a high rate, resulting in a very expensive arrangement.

In the circuit of FIG. 1, the signal SI has a frequency which is equal to (32×1024)f/31. Accordingly, the number of pulses in the signal SI during a time interval T will be 32×1024/31. In a digital circuit, a fraction below the decimal point of a number of pulses will be either rounded up or rounded off, causing an error. However, in the circuit of FIG. 1, the choice of different frequency dividing ratios of the frequency demultipliers 42 and 47 result in the appearance of a pulse in the signal SI during the time interval T at a phase which is displaced slightly from time to time, with consequence that during a certain period, a fraction in the number of pulses contained in the signal SI which is below the decimal point will be rounded off during a counting operation, but during a different period, a similar fraction in the number of pulses contained in the signal SI which are counted during the time interval T will be rounded up. As a consequence, when the number of pulses counted over a plurality of periods are averaged, the error will be reduced in magnitude.

In practice, since the period of the signal SJ, which determines the counting period of the counter 49, is equal to 31T, a measurement of time ΔT will be repeated 31 times, and an accumulated value of ΔT over 31T intervals, which means a value obtained by smoothing out the rounded up and rounded off errors, is counted by the counter 49, with its count latched in the latch 50. Since the number of pulses contained in the signal SI during the 31T interval is equal to 32×1024, a resolution in determining the phase difference (ΔT/T) will be equal to 1/(32×1024). Thus, the resolution will be improved by a factor of 32 as compared when the frequency dividing ratio of the frequency demultiplier is chosen to be an integral multiple of that of the frequency demultiplier 42. In this manner, the angular rate will be determined with a high accuracy even though the frequency of the signal SJ is low.

To give an example, assuming that the signal SH has a repetition frequency of 8 kHz, a clock pulse of 144 MHz must be used for counting, if a usual circuit is employed, in order to detect a phase difference with a resolution of 0.02°. This requires a very complicated circuit arrangement. However, in the present embodiment, the frequency of the clock pulse (SI) can be lowered to about 4.8 MHz, thus greatly simplifying the circuit arrangement.

Figure 2:
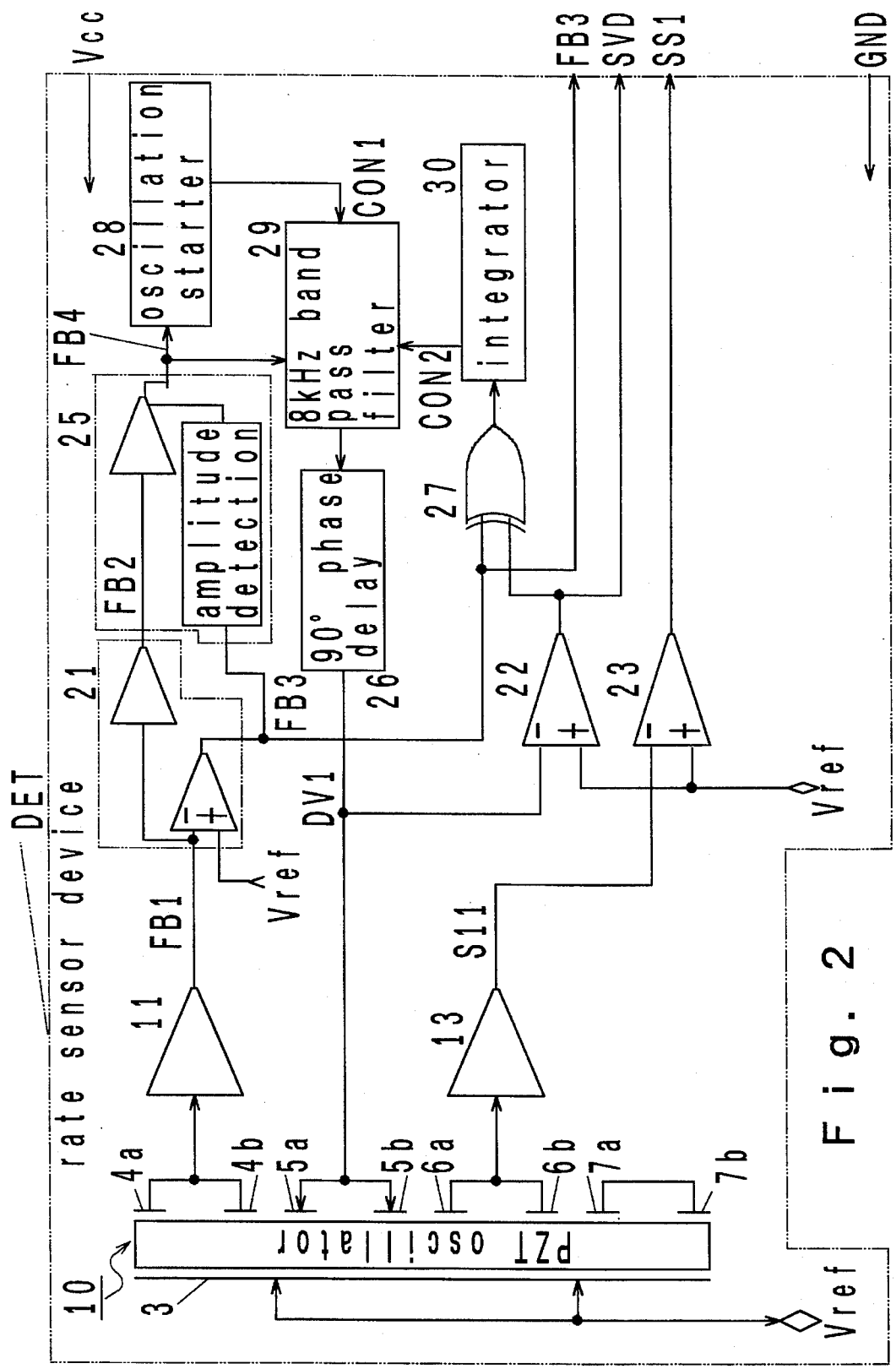
FIG. 2 is a block diagram of a rate sensor device DET shown in FIG. 1.

The specific construction of the rate sensor device DET shown in FIG. 1 is illustrated in FIG. 2 where an automatic gain control circuit 25 controls the gain in accordance with the amplitude of FB3.

Figure 3A:
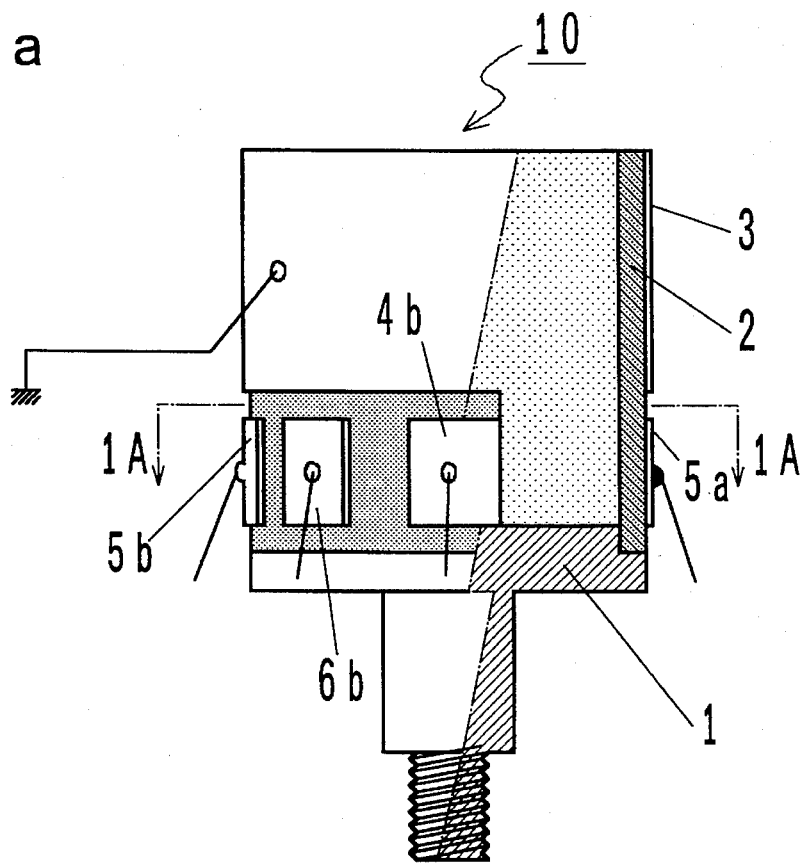
FIG. 3a is a front view, partly broken away, showing the appearance of an oscillator 10 shown in FIG. 2.
Figure 3B:
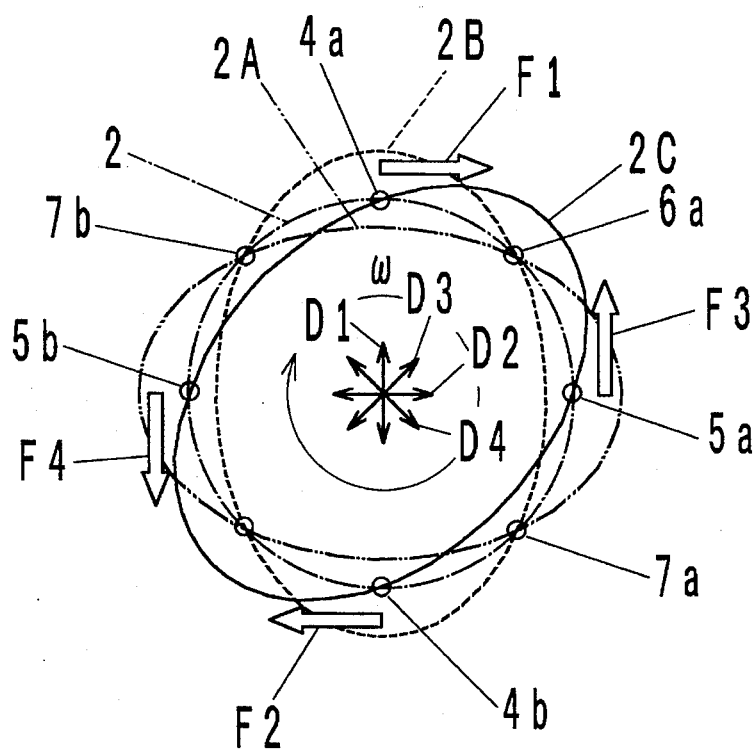
Figure 4A:
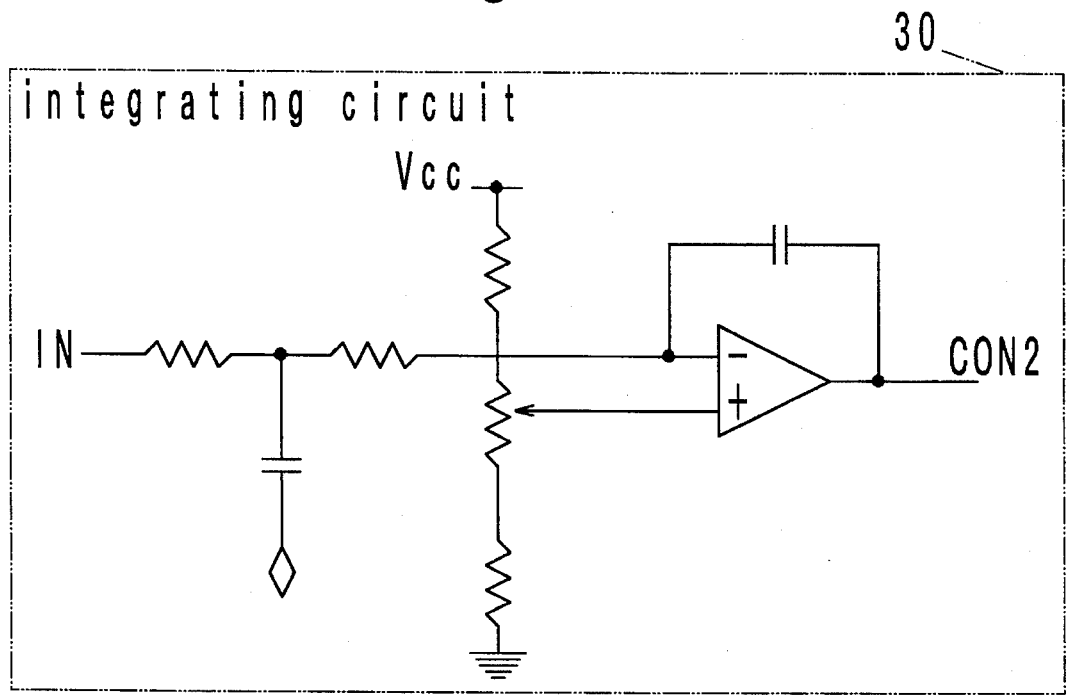
FIG. 4a is a circuit diagram of an integrating circuit 30 shown in FIG. 2.
Figure 4B:
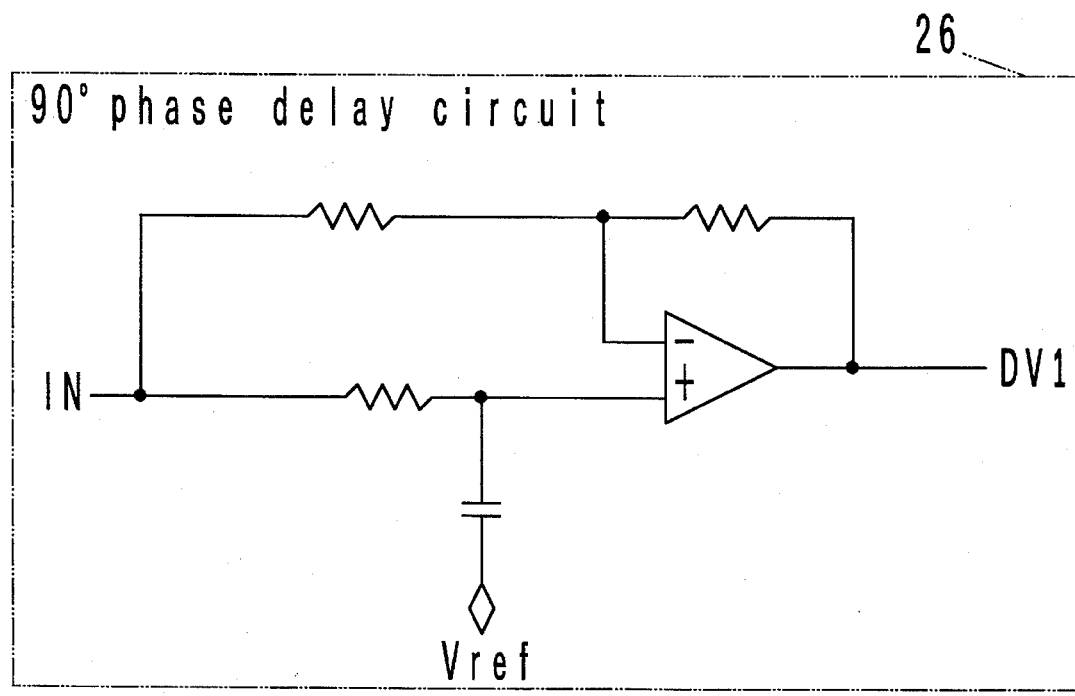
FIG. 4b is a circuit diagram of a 90° phase delay circuit 26 shown in FIG. 2.

A side view, partly in section, of the oscillator 10 shown in FIG. 2 is illustrated in FIG. 3a, and an electrode arrangement of the oscillator 10 is shown in FIG. 3b. Referring to FIGS. 3a and 3b, the oscillator 10 includes a cylindrical piezoelectric body 2, which is secured, at its bottom end, to an element base 1 having a disc at its top with a stem in the form of a round rod continuing from the bottom surface of the disc. A substantially upper half of the outer peripheral surface of the cylindrical piezoelectric body 2 is covered by a reference potential electrode 3 which is connected to the electric ground of the device, while a lower half of the outer peripheral surface has eight electrode segments of an identical configuration cemented thereto at a pitch of 45°.

Referring to FIG. 2 which shows a circuit arrangement, a pair of electrode segments 4a and 4b which are diametrically opposite to each other along a first diametrical direction D1 represent feedback electrodes; another pair of electrode segments 5a and 5b which are diametrically opposite to each other along a second diametrical direction D2 represent exciting electrodes; a further pair of electrode segments 6a and 6b which are diametrically opposite to each other along a third diametrical direction D3 represent detecting electrodes; and a final pair of electrode segments 7a and 7b which are diametrically opposite to each other along a fourth diametrical direction D4 are connected to each other, and are not used in the present embodiment, but may be used as a detecting electrode.

An alternating voltage produced by an oscillation circuit (28/29/26) is applied to the exciting electrodes 5a and 5b of the oscillator 10, and then the cylindrical piezoelectric body 2 is deformed and oscillates in response thereto. The oscillation of the piezoelectric body 2 produces an alternating voltage at the feedback electrodes 4a, 4b, and such voltage is passed through an amplifier 11, a waveform conversion circuit 21 and the automatic gain control circuit 25 to be fed back to the oscillation circuit (28/29/26). By utilizing such a feedback voltage, the oscillation circuit automatically adjusts the phase of its output voltage so that the piezoelectric body 2 oscillates at a frequency which coincides with its resonant frequency fm.

When the power is turned on to be applied to the oscillation circuit, a certain voltage is applied across the exciting electrodes 5a, 5b, and the reference potential electrode 3, whereupon the cylindrical piezoelectric body 2 expands or shrinks in the second diametrical direction D2. Such deformation develops a certain voltage across the feedback electrodes 4a, 4b and the reference potential electrode 3. In FIG. 3b, the cylindrical piezoelectric body 2 at its peak of shrinkage is indicated by dotted lines 2B and at its peak of expansion by double dot phantom lines 2A in exaggerated form, as the piezoelectric body 2 oscillates by expansion/shrinkage in the second diametrical direction D2 at its resonant frequency fm.

It will be seen from FIG. 3b that the expansion/shrinkage in the second diametrical direction D2 corresponds to the shrinkage/expansion in the first diametrical direction D1, and the peak of shrinkage in the direction D2 corresponds to the peak of expansion in the direction D1. Accordingly, in this example, the cylindrical piezoelectric body 2 oscillates in cruciform directions (D1 and D2).

When the cylindrical piezoelectric body 2 oscillates in the cruciform directions (D1 and D2) in the manner mentioned above (see double dot phantom lines 2A and dotted lines 2B shown in FIG. 3b), the detecting electrodes 6a, 6b are situated at the nodes of oscillation, and accordingly, a voltage which is developed across these detecting electrodes and the reference potential electrode 3 is low. Ideally, no voltage appears. However, since the piezoelectric body 2 is not a perfect cylinder in configuration, a voltage of a certain magnitude is developed.

When the cylindrical piezoelectric body 2 rotates, for example, clockwise, as viewed in FIG. 3b, the combination of such rotation and the oscillation of the piezoelectric body 2 produces Coriolis forces F1 to F4, which cause the direction of oscillation (D2) of the piezoelectric body 2 to be twisted or rotated into the third diametrical direction D3 (or fourth diametrical direction D4), as indicated by solid line 2C in FIG. 3b, thus increasing the magnitude of the voltage developed at the detecting electrodes 6a, 6b while simultaneously shifting the phase of such voltage. The amount of such phase shift corresponds to the angular rate of rotation which the piezoelectric body 2 undergoes. Accordingly, the circuit arrangement shown in FIG. 1 is provided with a circuit which determines the amount of phase shift of the signal appearing at the detecting electrodes 6a, 6b.

Referring to FIG. 2, the voltage developed at the feedback electrodes 4a, 4b of the cylindrical piezoelectric body 2 is amplified by the amplifier circuit 11 and then applied to a buffer amplifier and waveform conversion circuit 21 as a feedback signal FB1. An analog signal FB2 is delivered from the circuit 21, and a binary signal FB3 is delivered from the waveform conversion circuit. The signal FB2 is applied to a first input terminal of the automatic gain control circuit 25, and the signal FB3 is applied to a second input terminal of the automatic gain control circuit 25 and to one input terminal of a 90° phase comparison circuit 27.

Figure 11:
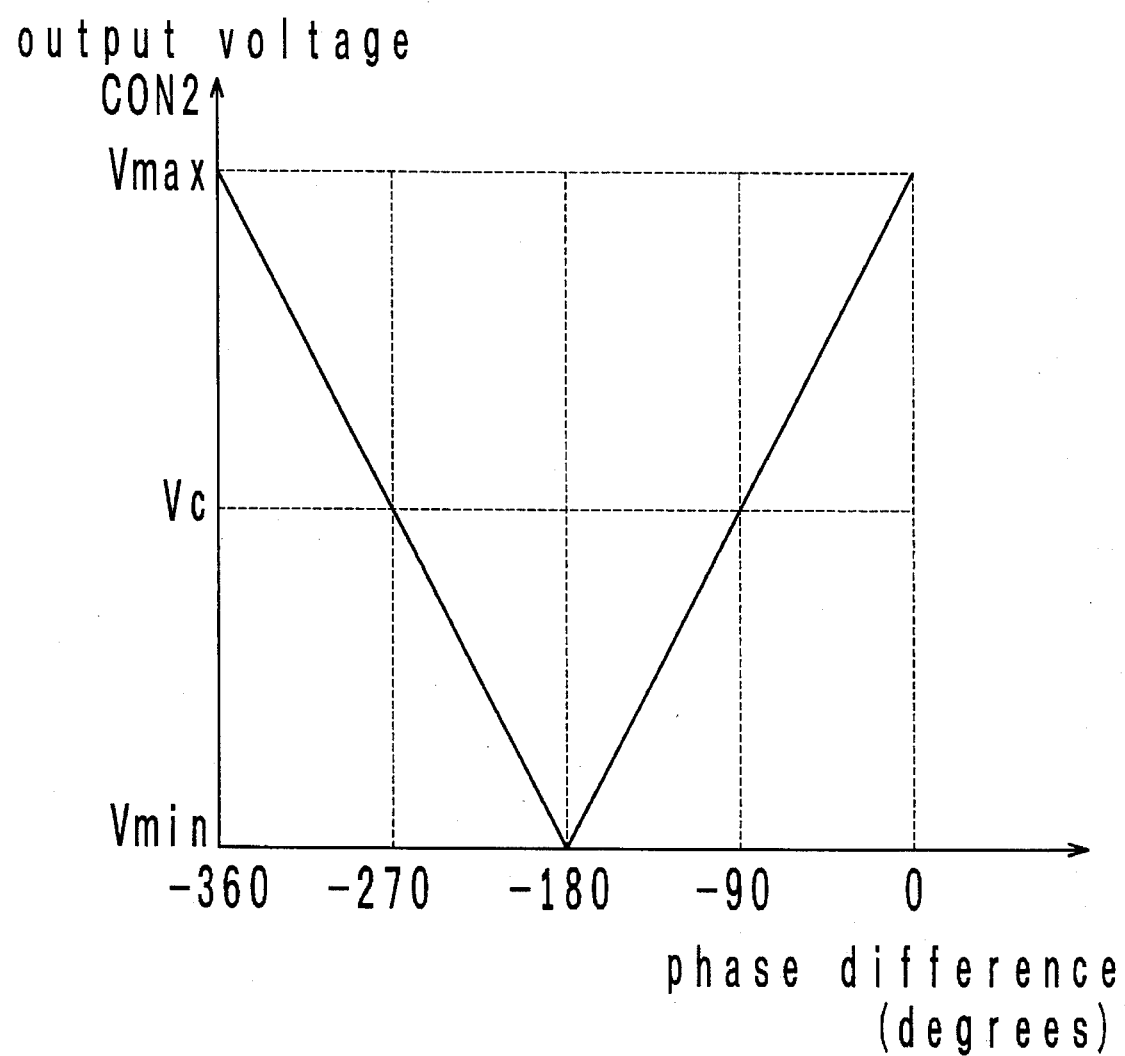
FIG. 11 graphically shows a relationship between a phase difference between two inputs to a 90° phase comparison circuit 27 shown in FIG. 2 and the voltage level of a control signal CON2 which is delivered by the integrating circuit 30.

The automatic gain control circuit 25 has an input/output response, as illustrated in FIG. 11, and a signal FB4 which is obtained at its output is substantially identical with the input signal FB2, but a signal above an excessive level is cut off and cannot appear in the signal FB4. The output signal FB4 delivered by the automatic gain control circuit 25 is applied to a first input terminal of a band pass filter 29 and to an input terminal of an oscillation starter circuit 28. A signal CON1 delivered by the oscillation starter circuit 28 is applied to a second input terminal of the band pass filter 29. A signal CON2 applied to a third terminal of the band pass filter 29 is delivered by an integrating circuit 30.

The band pass filter 29 delivers an output signal which passes through the 90° phase delay circuit 26 to be delivered as a drive signal DV1, which is in turn applied to the exciting electrodes 5a, 5b of the cylindrical piezoelectric body 2. The drive signal DV1 is also converted into a binary signal by a waveform conversion circuit 22 to be input to a 90° phase comparison circuit 27. The comparison circuit 27 essentially comprises an exclusive OR gate, and delivers a pulse signal having a pulse width which depends on a phase difference between the feedback signal FB3 delivered from the waveform conversion circuit 21, including a buffer amplifier and comparator, and a signal SVD delivered by the waveform conversion circuit 22. This pulse signal is applied to the integrating circuit 30.

The level of the signal CON2 delivered by the integrating circuit 30 changes in the manner depicted in FIG. 11 in accordance with a phase difference between the feedback signal FB3 output from the waveform conversion circuit 21 and the output signal SVD from the waveform conversion circuit 22. The signal CON2 is applied to the third input terminal of the band pass filter 29.

Figure 5A:
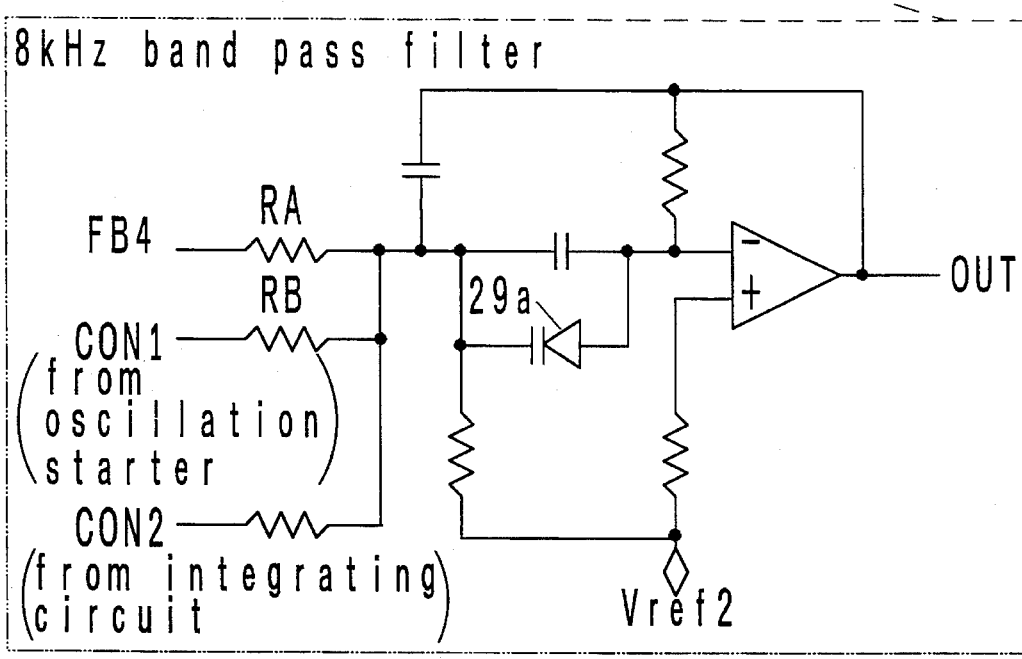
FIG. 5a is a circuit diagram of a 8 kHz band pass filter 29 shown in FIG. 2.

The band pass filter 29 includes a variable capacitance diode (variable capacitor) 29a as indicated in FIG. 5a, which is used in its reverse-biased condition. Thus, by changing a bias voltage applied to the variable capacitance diode 29a, the gain and the phase response of the band pass filter 29 changes in the manner illustrated in FIG. 12a. A bias voltage applied to the variable capacitance diode 29a changes in accordance with the level of the signals FB4, CON1 and CON2 applied to the three input terminals of the band pass filter 29.

In the present embodiment, the voltage developed at the feedback electrodes 4a, 4b of the piezoelectric body 2 is amplified, and is then phase shifted. By applying the phase shifted signal to the exciting electrodes 5a, 5b, a closed loop circuit is formed while encouraging the occurrence of an oscillation by applying a positive feedback. In actuality, referring to FIG. 2, the voltage developed at the feedback electrodes 4a, 4b passes through the amplifier circuit 11 to provide the signal FB1, which is then passed through the buffer amplifier and the waveform conversion circuit 21 to provide the signal FB2, which is then passed through the automatic gain control circuit 25 to provide the signal FB4, which is in turn passed through the band pass filter 29, the 90° phase delay circuit 26 and a drive current detector circuit 12 before it is applied to the exciting electrodes 5a, 5b, thus forming a closed loop circuit.

In order for an oscillation to occur within this closed loop circuit, two requirements must be satisfied. One of the requirements is that the loop gain of the closed loop circuit be equal to or greater than 1, and another requirement is that a phase change during one excursion through the closed loop circuit be an integral multiple of 360°. For the circuit shown in FIG. 2, when the oscillator 10 is oscillating at its natural frequency, a phase difference between the exciting electrodes 5a, 5b and the feedback electrodes 4a, 4b will be 90°. A phase difference between the input and the output of the 90° phase delay circuit 26 will be about 90° for frequencies near the resonant frequency of the oscillator 10. In addition, a phase difference between the input (FB4) and the output of the band pass filter 29 will be 180° under a given condition. Accordingly, summing a phase shift between the exciting electrodes 5a, 5b and the feedback electrodes 4a, 4b, a phase shift through the 90° phase delay circuit 26 and a phase shift through the band pass filter 29, a phase change which occurs during one excursion through the closed loop circuit can be made equal to 360°. Since an amplifier circuit is included in the loop, the loop gain of the oscillator 10 with respect to the resonant frequency can be made to be equal to or greater than 1. Accordingly, the closed loop circuit of the circuit arrangement shown in FIG. 2 can be made to oscillate at the resonant frequency of the oscillator 10.

Figure 12A:
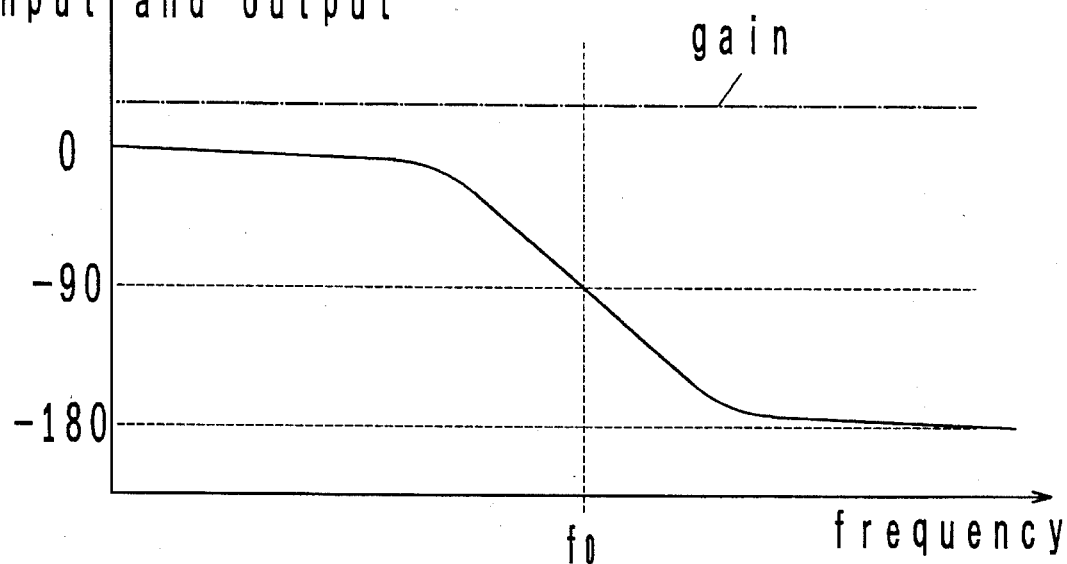
FIG. 12a graphically shows a relationship between the frequency of an input voltage to the 90° phase delay circuit 26 shown in FIG. 2 and the phase difference between the input and the output voltage.
Figure 12B:
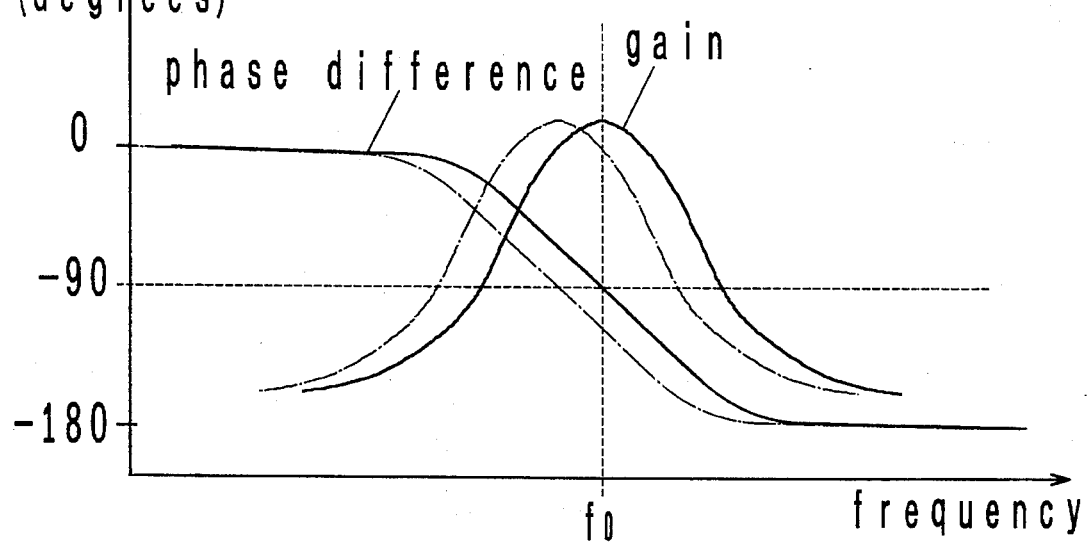
FIG. 12b graphically shows a relationship between the oscillation frequency of the oscillator 10 and the phase difference of the feedback voltage with respect to the exciting voltage and the gain (feedback voltage divided by the exciting voltage) of the oscillator 10.

The phase difference between the exciting voltage and the feedback voltage and the gain (the feedback voltage divided by the exciting voltage) of the oscillator 10 are shown by solid lines in FIG. 12b, as plotted against the frequency of the exciting voltage. It will be seen that the gain will be at its maximum while the phase difference is nearly 90° at the natural frequency $f_0$.

However, even if an oscillator 10 is designed to provide the natural frequency $f_0$, the resonant frequency of the resulting oscillator 10 will be slightly offset from $f_0$ due to variations in the size during the manufacturing process or under the influence of a change in the size which is caused by a temperature change, as illustrated by phantom lines in FIG. 12b. When using an oscillator 10 having a response as indicated by such phantom lines, the phase difference will be substantially offset from 90° at the frequency $f_0$, and accordingly, if a sum of the phase shift through the 90° phase delay circuit 26 and the phase shift through the band pass filter 29 has a fixed value corresponding to 270° as considered for the frequency $f_0$, the oscillator fails to oscillate.

The 90° phase delay circuit 26 exhibits a phase response, as indicated in FIG. 12a, for example, and accordingly, it produces an output signal which has a phase shift of 90° with respect to the input signal at the frequency $f_0$, but has a different amount of phase shift for other frequencies. Accordingly, if the oscillator 10 has a natural frequency $f'_0$ which is different from $f_0$, the 90° phase delay circuit 26 cannot afford a phase shift of 90°, which is required to provide a one excursion phase difference through the closed loop circuit of 360°, for this oscillator 10, which therefore may fail to oscillate.

However, in the present embodiment, a phase change experienced during one excursion through the closed loop circuit is controlled to be 360°, principally by the action of the band pass filter 29, for frequencies in a relatively wide range which is centered about a designed value $f_0$ for the natural frequency of the oscillator 10. In this manner, the oscillation of the oscillator 10 is assured if the natural frequency deviates from a designed value or reference value $f_0$ due to variations in the response of the oscillator 10 from product to product or due to a temperature change.

Figure 8A:
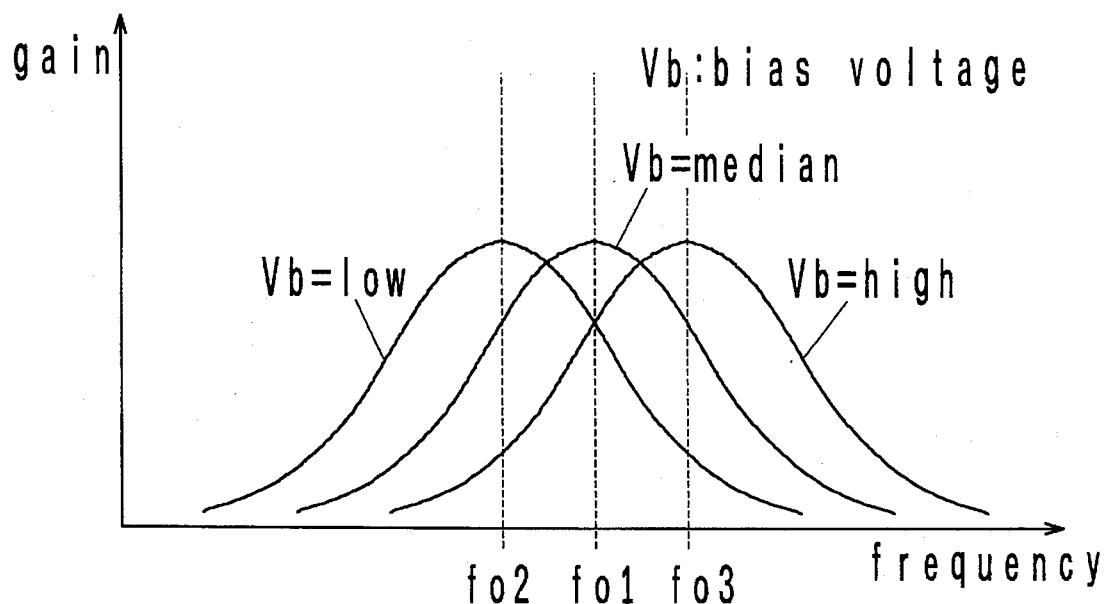
FIG. 8a graphically shows the frequency/gain response of 8 kHz band pass filter 29 shown in FIG. 2.
Figure 8B:
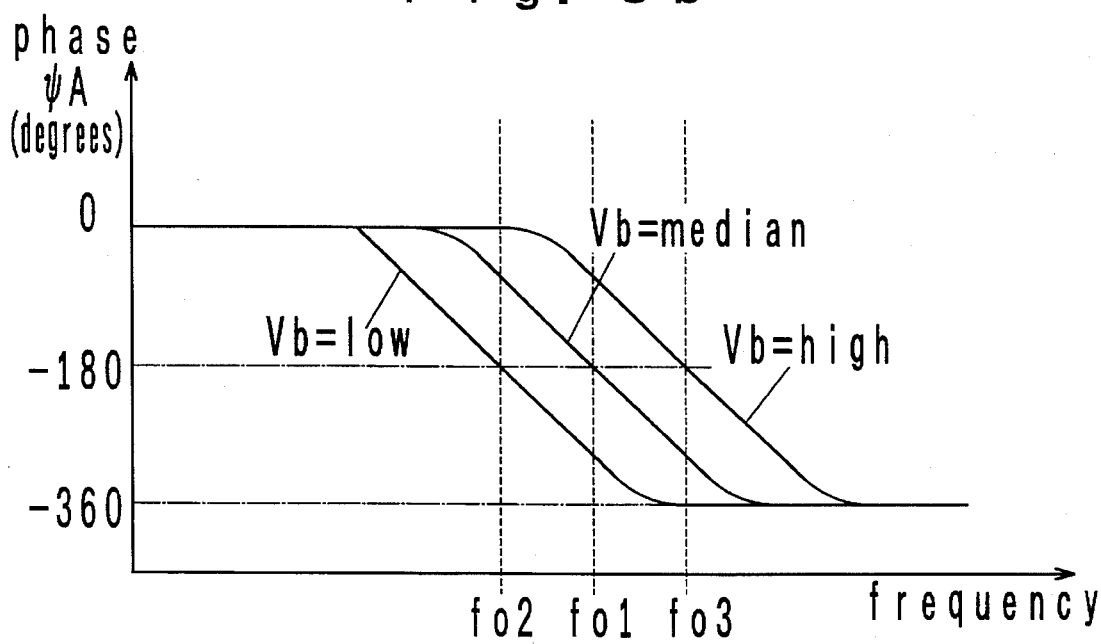
FIG. 8b graphically shows the frequency of the voltage passing through the band pass filter 29 shown in FIG. 2 and the phase of such voltage relative to the exciting voltage.

The construction of the band pass filter 29 is shown in FIG. 5a. The band pass filter 29 exhibits a gain response as shown in FIG. 8a and a phase response as shown in FIG. 8b. The resonant frequency of the filter varies in accordance with the bias voltage Vb applied to the variable capacitance diode 29a.

Referring to FIG. 8a, when the bias voltage Vb is "median", for example, the resonant frequency or center frequency will be $f_{01}$ which may be assumed to be a reference frequency $f_0$, and it is seen that the gain will be at its maximum at the frequency $f_{01}$ while the amount of phase shift will be equal to 180° (see the phase response of FIG. 8b) at the frequency $f_{01}$. For a frequency $f_{02}$ lower than the frequency $f_{01}$, the amount of phase shift will be less than 180° while for a frequency $f_{03}$ higher than the frequency $f_{01}$, the amount of phase shift will be greater than 180°.

When the bias voltage Vb is "low", the resonant frequency will be $f_{02}$, and the gain will be at its maximum at the frequency $f_{02}$ (see the gain response of FIG. 8a), while the amount of phase shift will be 180° at frequency $f_{02}$ (see the phase response of FIG. 8b). For a frequency lower than the frequency $f_{02}$, the amount of phase shift will be less than 180° while for a frequency $f_{01}$ higher than the frequency $f_{02}$, the amount of phase shift will be greater than 180°.

When the bias voltage Vb is "high", the resonant frequency will be $f_{03}$, and the gain will be at its maximum at the frequency $f_{03}$ (see the gain response of FIG. 8a), while the amount of phase shift will be 180° at frequency $f_{03}$ (see the phase response of FIG. 8b). For a frequency $f_{01}$ lower than the frequency $f_{03}$, the amount of phase shift will be less than 180° while for a frequency higher than the frequency $f_{03}$, the amount of phase shift will be greater than 180°.

Thus, when the magnitude of the bias voltage Vb is increased, the signal passing through the band pass filter 29 will experience a greater phase shift. Conversely, when the magnitude of the bias voltage Vb is reduced, the signal passing through the band pass filter 29 experiences a less phase shift. The bias voltage Vb is determined by the voltages FB4, CON1 and CON2 applied to the three input terminals of the band pass filter 29. It is to be noted that these voltages include dc components (mostly in CON1 and CON2) and ac component (mostly in FB4), and the both components have influence upon the bias voltage Vb. In the present embodiment, the amplitude of the ac component is chosen to be sufficiently small with respect to the level of the dc component, thereby preventing the response of the band pass filter 29 from experiencing a large variation under the influence of the ac component.

By way of example, when the oscillator 10 is oscillating at its natural frequency, a phase difference between the signals applied to the two input terminals of the 90° phase comparison circuit 27 shown in FIG. 2 will be 90°, and accordingly, the level of the signal CON2 delivered from the integrating circuit 30 will be at a reference level Vc shown in FIG. 11, and the resonant frequency of the band pass filter 29 will be at $f_{01}$ shown in FIGS. 8a and 8b, for example.

When the resonant frequency $f_0$ of the oscillator 10 and the resonant frequency $f_{01}$ of the band pass filter 29 coincide, the phase shift through the band pass filter 29 at this frequency will be 180°, and the phase shift through the 90° phase delay circuit 26 will also be 90°, so that the amount of phase shift during one excursion through the closed loop circuit will be 360°, thus allowing the closed loop circuit to oscillate.

As mentioned, the phase shift between the exciting electrodes 5a, 5b and the feedback electrodes 4a, 4b will be equal to 90° at the resonant frequency of the oscillator 10, and accordingly if the amount of phase shift through the remaining portion of the closed loop other than the oscillator 10 (equivalent to φA+φB) is equal to 270°, the oscillation occurs at the frequency f if the resonant frequency f of the oscillator 10 is offset from the reference value $f_0$. The phase shift φA through the band pass filter 29 changes with the frequency in the manner shown in FIG. 8b, and the phase shift φB through the 90° phase delay circuit 26 changes with the frequency in the manner shown in FIG. 12a.

If a sum of the phase shift φA through the band pass filter 29 and the phase shift φB through the 90° phase delay circuit 26 for the frequency f is less than 270°, the phase difference between the signals FB3 and DV1 will also be less than 270°, with consequence that the level of the signal CON2 corresponding to such phase difference will be less than Vc. Accordingly, the resonant frequency of the band pass filter 29 will be lower than $f_{01}$, increasing the phase shift φA through the band pass filter 29. The output voltage CON2 from the integrating circuit 30 increases, whereby the amount of phase shift φA+φB approaches 270° and the output voltage from the integrating circuit 30 converges to Vc (FIG. 11).

If a sum of the phase shift φA through the band pass filter 29 and the phase shift φB through the 90° phase delay circuit 26 for the frequency f is greater than 270°, the phase difference between the signals FB3 and DV1 will be greater than 270°, and accordingly, the level of the signal CON corresponding to such phase difference will be greater than Vc. As a consequence, the resonant frequency of the band pass filter 29 will be higher than $f_{01}$, decreasing the phase shift φA through the band pass filter 29. The output voltage CON2 from the integrating circuit 30 decreases, whereby the sum of phase shifts φA+φB approaches 270° and the output voltage from the integrating circuit 30 converges to Vc (see FIG. 11).

To confirm the described operation of the embodiment, the oscillator 10 is removed from the circuit shown in FIG. 2, and an output signal from a sinusoidal wave generator having a variable frequency, which is used for purpose of measurement, is applied to the input of the amplifier 11 instead, and the oscillation frequency of the sinusoidal wave generator is changed from 5.0 kHz to 9.4 kHz while measuring the phase difference between the input signal to the amplifier circuit 11 and the output signal DV1 from the 90° phase delay circuit 26 and also the magnitude of the control voltage CON2 applied to the band pass filter 29. Result of such measurement is shown in FIG. 13.

Figure 13:
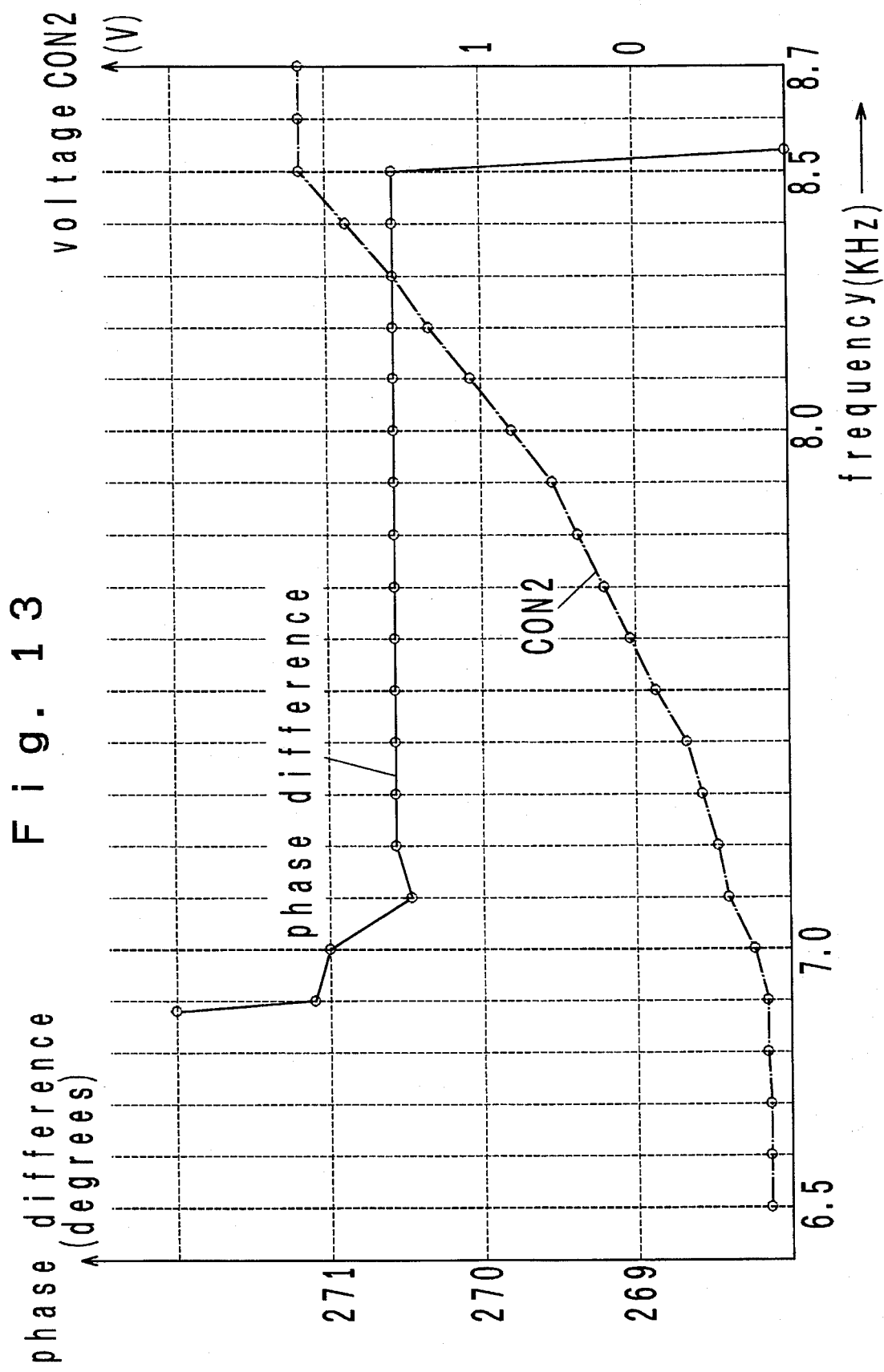
FIG. 13 graphically shows a phase difference between an input signal to an amplifier circuit 11 and an output signal DV1 from the 90° phase delay circuit 26, and the control voltage CON2 applied to the band pass filter 29, when the oscillator 10 is removed from the rate sensor device DET shown in FIG. 2, and is replaced by a sinusoidal wave oscillator having a variable frequency which is connected to the amplifier 11, and as the oscillation frequency of the sinusoidal wave oscillator is changed from 6.5 to 8.7 kHz.

Referring to FIG. 13, it is seen that the phase difference is substantially 270° over a broad range from 6.9 to 8.5 kHz. Accordingly, if the resonant frequency of the oscillator 10 remains within a range from 6.9 to 8.5 kHz, the phase shift experienced during one excursion through the closed loop circuit will be 360°, thus reliably producing an oscillation in the circuit shown in FIG. 2. Reference to FIG. 13 also indicates that the voltage level of the control signal CON2 varies with the frequency, so that it will be appreciated that when the oscillator 10 is connected in the manner shown in FIG. 2, the response of the band pass filter 29 changes in accordance with the natural frequency of the oscillator to provide for the phase compensation.

Returning to FIG. 2, the signal appearing at the first detecting electrodes 6a, 6b of the oscillator 10 is detected by an amplifier circuit 13 and is converted into a binary signal (square wave) by a waveform conversion circuit 23 to be delivered as a signal SS1. In this embodiment, signals FB3 and SS1, chosen from a multiplicity of signals delivered from the rate sensor device DET, are used to detect the angular rate of rotation.

Figure 5B:
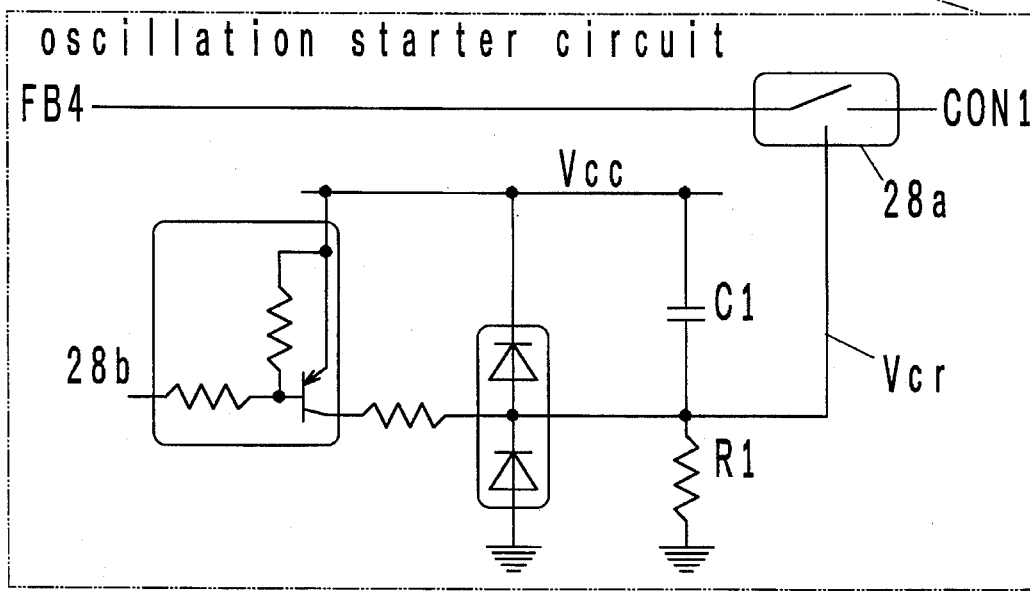
FIG. 5b is a circuit diagram of an oscillation starter circuit 28 shown in FIG. 2.
Figure 6:
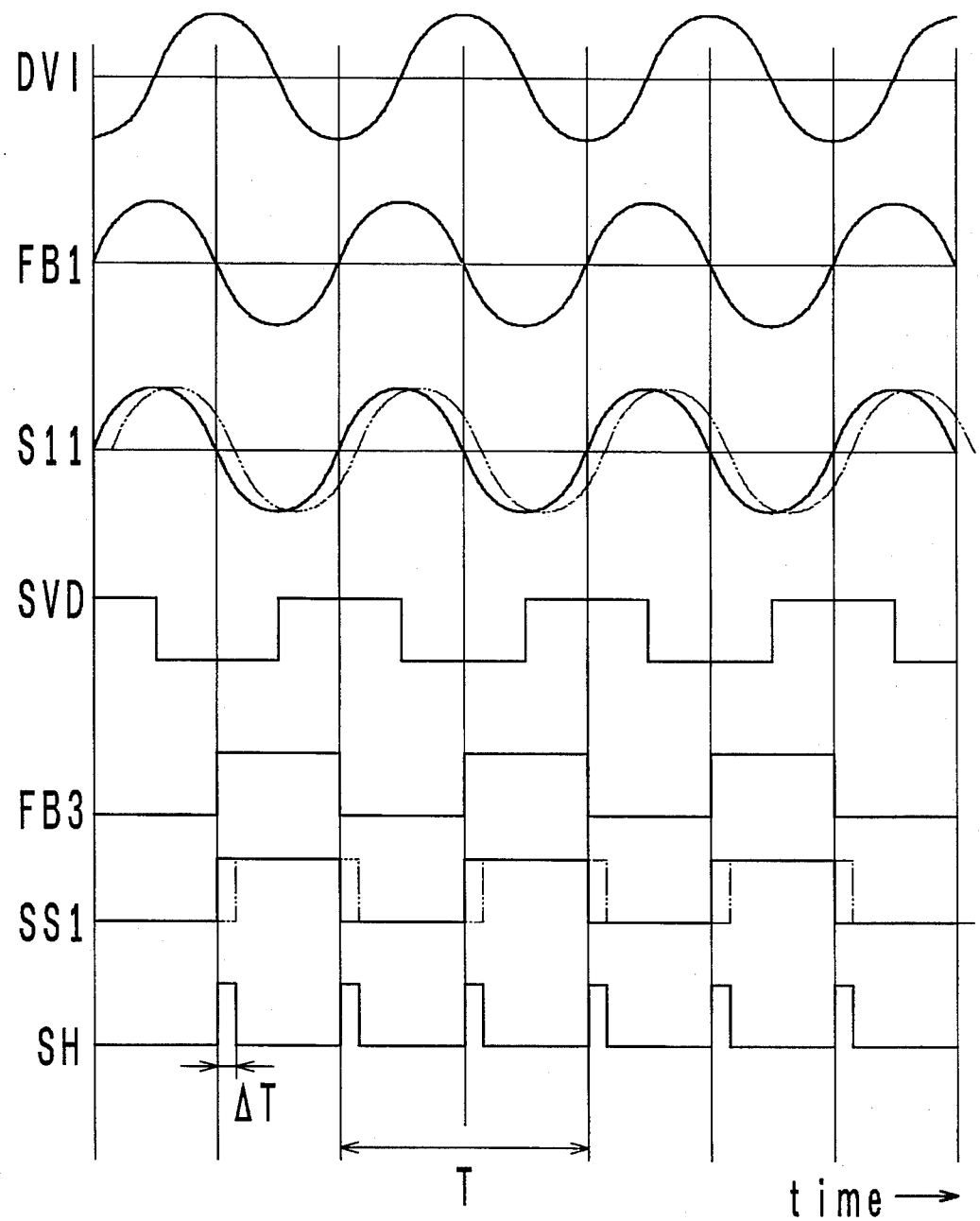
FIG. 6 is a series of timing charts illustrating various electrical signals appearing at selected points in the rate sensor device DET shown in FIG. 2.

The oscillation starter circuit 28 is connected to the band pass filter 29. The oscillation starter circuit 28 is constructed as shown in FIG. 5b so that it increases the loop gain of the closed loop circuit temporarily upon turning on the power. When the loop gain is increased, the range of frequencies which satisfy the condition for oscillation is broadened, thus allowing, if the oscillator has started an unstable oscillation at a frequency which is greatly offset from the resonant frequency thereof immediately after the power is turned on, the oscillation frequency to be brought close to the resonant frequency so as to stabilize the oscillation.

Figure 9:
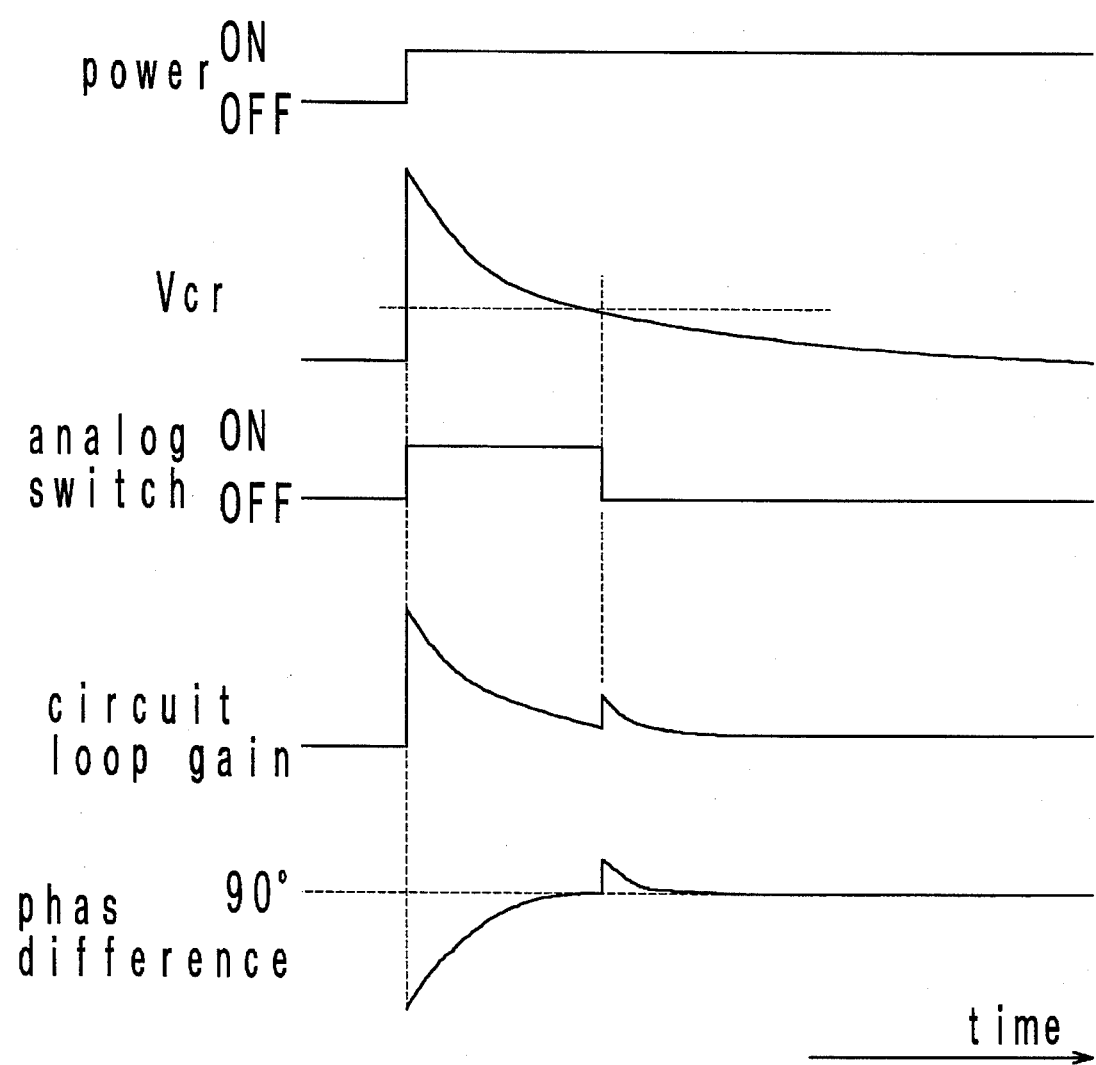
FIG. 9 is a series of timing charts illustrating various electrical signals appearing at selected points in the electrical circuit shown in FIG. 2.
Figure 10:
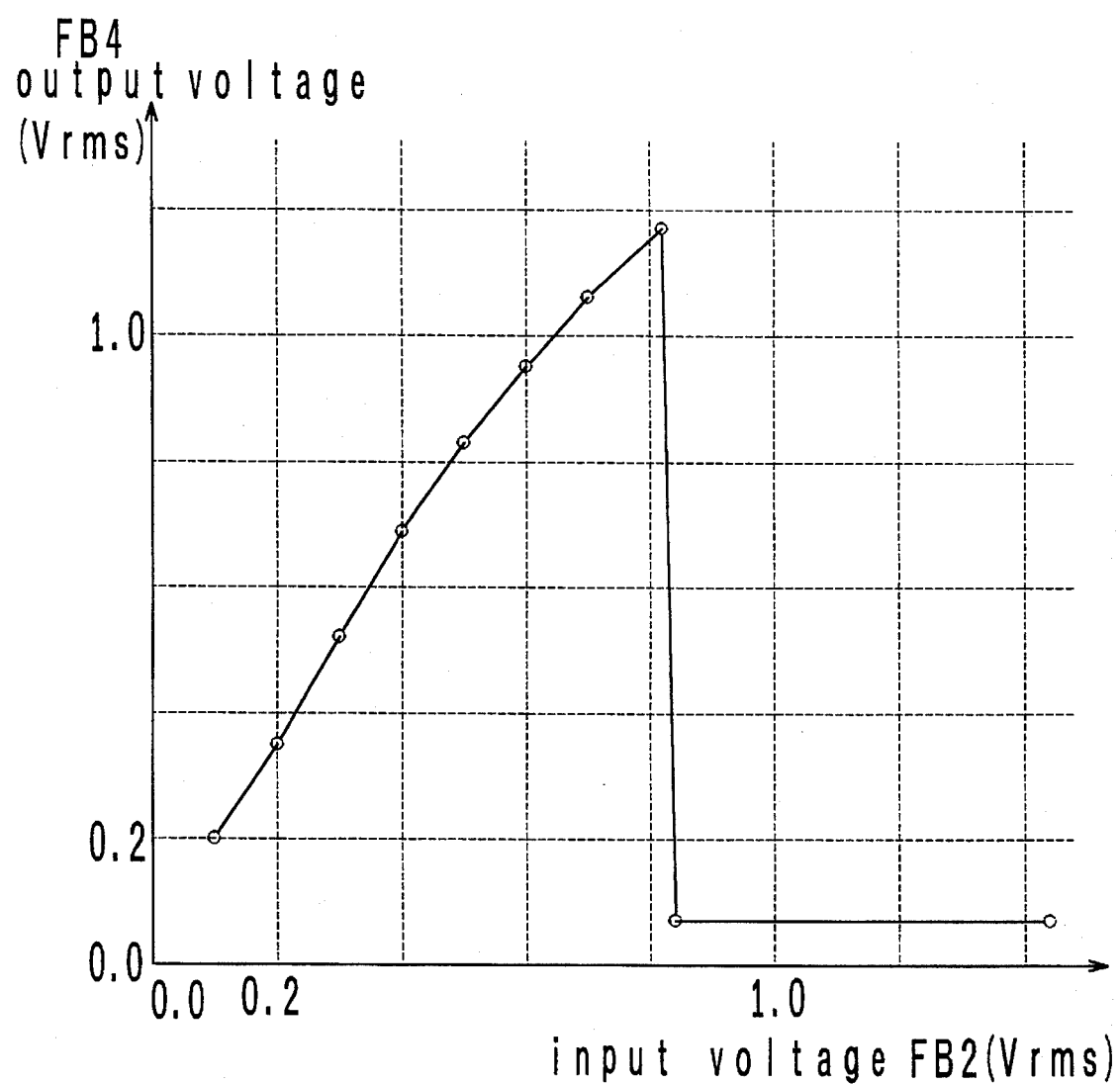
FIG. 10 graphically shows the input/output voltage response of an automatic gain control circuit 25 shown in FIG. 2.

Referring to FIG. 5b, the oscillation starter circuit 28 includes an analog switch 28a, the input side of which is connected to the signal FB4, and signal CON1 appearing at the output of the switch is input to the band pass filter 29. When the power supply (Vcc) is turned on, a current which charges a capacitor C1 passes through a series circuit of capacitor C1 and resistor R1, and a voltage drop Vcr across the resistor R1 changes from the ground level to a high level, thus switching the analog switch 28a on. As the capacitor C1 continues to be charged and its voltage approaches Vcc, the voltage drop Vcr across the resistor R1 is reduced, turning the analog switch 28a off. Thus, a time constant circuit comprising capacitor C1 and resistor R1 represents a kind of timer acting to increase the voltage Vcr to turn the switch 28a on for a given time interval upon turn-on of the power, as shown in FIG. 9. By applying a given reset signal to an input terminal 28b of the oscillation starter circuit 28, a discharge circuit for capacitor C1 is completed. When the reset signal is removed, the charging of the capacitor C1 is commenced in a similar manner as immediately after the turn-on of the power, allowing the analog switch 28a to be turned on temporarily again, without again turning the power on.

Referring to FIG. 5a, when the analog switch 28a is off, a current corresponding to the signal FB4 alone passes through resistor RA to be supplied to the filter 29. In other words, a first signal corresponding to the voltage developed at the feedback electrode is applied to the filter 29. When the analog signal 28a is on, the current corresponding to the signal FB4 passes through a parallel circuit of resistors RA and RB (see FIGS. 5a and 5b). In other words, a sum of the first signal and a second signal corresponding to the voltage developed at the feedback electrode is applied to the filter 29. Accordingly, when the analog switch 28a is on, the positive feedback loop in which the 8 kHz band pass filter 29 is included exhibits a higher gain.

In the described embodiment, a phase difference between the signal applied to the exciting electrodes 5a, 5b and the signal developed at the feedback electrodes 4a, 4b has been controlled to be 90° in order to cause the cylindrical piezoelectric body 2 to oscillate and to be maintained in resonance. However, it is unnecessary that the phase difference be 90°. Thus, the amount of phase shifts through the band pass filter 29 or the 90° phase delay circuit 26 may be modified, provided any other phase difference is available where the resonance is possible. As a matter of practice, it is contemplated that the resonance of the oscillator 10 is achieved at its maximum amplitude when the phase difference is slightly offset from a theoretical value of 90° due to variations in the circuit parameters and the oscillator response. Accordingly, if the theoretical value of the phase difference is presumed to be 90°, it is possible in practice to control the phase difference in a range from 80° to 100°. In addition, the oscillation frequency of the oscillator 10 need not be in complete coincidence with the natural frequency thereof. While the coincidence between the oscillation frequency and the natural frequency is most preferred, so long as the oscillation frequency is close to the natural frequency, the occurrence of noises can be prevented to a certain degree, presenting no problem for practical purposes.

With the embodiment described above, if a voltage of a frequency which is offset from the natural frequency is developed at the feedback electrode of the oscillator 10 immediately after the power to the rate sensor device DET is turned on, or if the natural frequency of the oscillator 10 is offset from a reference or designed value due to variations in the response of the oscillator 10 from product to product or under the influence of the temperature change, the control signal CON2 produced by the combination of the 90° phase comparison circuit 27 and the integrating circuit 30 is effective to modify the amount of phase change of the signal through the band pass filter 29 so as to enable a positive feedback to be reliably applied to the oscillator 10, thus preventing a failure to start the oscillation of the oscillator 10.

The loop gain of the positive feedback circuit will be reduced by the filter 29 for noise components of frequencies other than those close to the resonant frequency of the variable band pass filter 29, whereby the rate sensor is less susceptible to the influence of noise components and achieves an oscillation with a stabilized frequency.

Since the oscillation starter circuit 28 temporarily increases the loop gain of the positive feedback circuit for a given time interval immediately after the power to the rate sensor device is turned on, if the frequency of the voltage developed at the feedback electrode of the oscillator is relatively largely offset from the natural frequency, the increased loop gain provides a high voltage level which is applied to the exciting electrode of the oscillator 10, thus assisting in initiating the oscillation of the oscillator 10.

In the described embodiment, the clock pulse SI counted by the counter 49 is formed on the basis of the signal SS1 which is delivered by the rate sensor device DET and which has the same frequency as the oscillation frequency of the oscillator 10, any offset of the oscillation frequency of the oscillator 10 from a reference or designed value cannot cause an error in the phase difference indicated by the counter 49. Finally, by controlling a counting operation by the counter 49 using the signals SI and SJ produced by the frequency demultiplier 42 and the frequency multiplier circuit 43, and by choosing so that the ratio of the frequency dividing ratio (31) of the frequency demultiplier 42 to the frequency multiplying ratio (32×1024) of the frequency multiplier 43 is offset from an integral multiple, a high accuracy (or high resolution) measurement is achieved by counting a clock pulse SI of a low frequency, which would normally result in a reduced resolution. In this manner, a counter and an associated circuit may be constructed in an inexpensive manner.

What is claimed is:

1. An oscillator unit comprising an oscillator including an exciting electrode to which an exciting voltage is applied, a feedback electrode at which a voltage having a given phase difference with respect to the exciting voltage is developed, and a detecting electrode at which a voltage having a phase with respect to the exciting voltage which varies in accordance with an angular rate is developed; phase difference detecting means for detecting a deviation of an actual phase difference between a voltage applied to the exciting electrode and a voltage developed at the feedback electrode with respect to a reference phase difference or a phase difference between the voltage to the exciting electrode and the voltage at the feedback electrode when the oscillator is oscillating at its natural frequency; and filter means responsive to the deviation for picking off frequency components of the voltage developed at the feedback electrode which are required to substantially null the deviation and providing a feedback of such frequency components to the exciting electrode.

2. An oscillator unit according to claim 1 in which the filter means comprises a variable band pass filter having a resonant frequency which varies in response to a signal applied to its control terminal.

3. An oscillator unit according to claim 2 in which the phase difference detecting means comprises means for detecting a time difference between the exciting voltage and the voltage developed at the feedback electrode, and integrating means for integrating the time difference and applying a signal representing an integrated value to the control terminal.

4. An oscillator unit according to claim 1, further including oscillation starting means for temporarily establishing a higher loop gain of a positive feedback loop including the oscillator and the filter means for a given time interval immediately after the turn-on of the power.

5. An oscillator unit according to claim 4 in which the oscillation starter means includes an analog switch which when it is on applies a second signal corresponding to the voltage developed at the feedback electrode to the filter means in addition to a first signal which corresponds to the voltage developed at the feedback electrode and which is applied to the filter means, and a time constant circuit for applying a turn-on voltage to the analog switch for a given time interval immediately after the turn-on of the power.

* * * * *